(12) United States Patent
Omori et al.

(10) Patent No.: US 6,469,270 B1
(45) Date of Patent: Oct. 22, 2002

(54) GAS INSULATED SWITCHGEAR

(75) Inventors: Takashi Omori; Toyokazu Tanaka; Masahira Wachi; Katsuyuki Takada, all of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/492,127

(22) Filed: Jan. 27, 2000

(30) Foreign Application Priority Data

Jan. 29, 1999 (JP) ............................................. 11-021218

(51) Int. Cl.⁷ ............................................... H01H 33/14
(52) U.S. Cl. ........................................... 218/7; 361/611
(58) Field of Search ........................ 361/611–614, 624, 361/604; 218/7, 14, 154

(56) References Cited

U.S. PATENT DOCUMENTS 3,889,175 A * 6/1975 Isogai et al. .................. 321/11
5,559,669 A * 9/1996 Inami et al. ................. 361/612
5,625,530 A * 4/1997 Inami et al. ................. 361/604

FOREIGN PATENT DOCUMENTS

JP          10-136517         5/1998

* cited by examiner

*Primary Examiner*—Lincoln Donovan
(74) *Attorney, Agent, or Firm*—Mattingly, Stanger & Malur, P.C.

(57) ABSTRACT

In order to realize reduction of a gas insulated switchgear, a connection bus for connecting potential current transformer units, a first connecting unit, power receiving units and transformer connecting units or for connecting the potential current transformer unit, a bypass unit, a first connecting unit, the power receiving units and transformer connecting units is arranged horizontally to a connecting unit and in parallel thereto. Thereby height dimensions of the transformer connecting units, potential current transformer units and transformer connecting units can be made small and thus a height dimension of the entire apparatus can be made small.

9 Claims, 10 Drawing Sheets

GAS INSULATED SWITCHGEAR

BACKGROUND OF THE INVENTION

The present invention relates to a gas insulated switchgear which is installed in a demander or the like having a substation or a power receiver/transformer facility. A conventional gas insulated switchgear, as disclosed, e.g., in JP-A-10-136517, comprises power receiving units corresponding to two lines, potential current transformer units corresponding two lines, transformer connecting units corresponding to two lines, connecting unit for connecting respective primary sides of the potential current transformer units of the lines, and connecting units for connecting respective secondary sides of the potential current transformer units of the lines, the two connecting units being arranged in parallel vertically in two stages.

In the conventional gas insulated switchgear wherein the two connecting units are arranged in parallel vertically in two stages, it is necessary to make the dimensions of the potential current transformer units large and to increase the height of the transformer connecting units according to the layout of the connecting units, which results in an increase in the overall height of the entire apparatus. For this reason, when the gas insulated switchgear is disassembled for transformation, an ordinary truck cannot be employed for transportation due to the transportation height restriction of the Japanese Road Traffic Act and thus a special trailer having a low rear body must be used therefor.

SUMMARY OF THE INVENTION

It is a main object of the present invention to realize size reduction of a gas insulated switchgear.

The basic feature of the present invention is to arrange a connection bus for connecting potential current transformer units, a first connecting unit, power receiving units and transformer connecting units or for connecting the potential current transformer unit, a bypass unit, a first connecting unit, the power receiving units and transformer connecting units, horizontally to a second connecting unit and in parallel thereto. When the connection bus is arranged horizontally to the second connecting unit and in parallel thereto in such a manner, the height dimensions of the power receiving unit, potential current transformer units and transformer connecting units can be made small and thus the height dimension of the entire apparatus can be made small.

DESCRIPTION OF THE EMBODIMENTS

Embodiment 1

Figure 11:
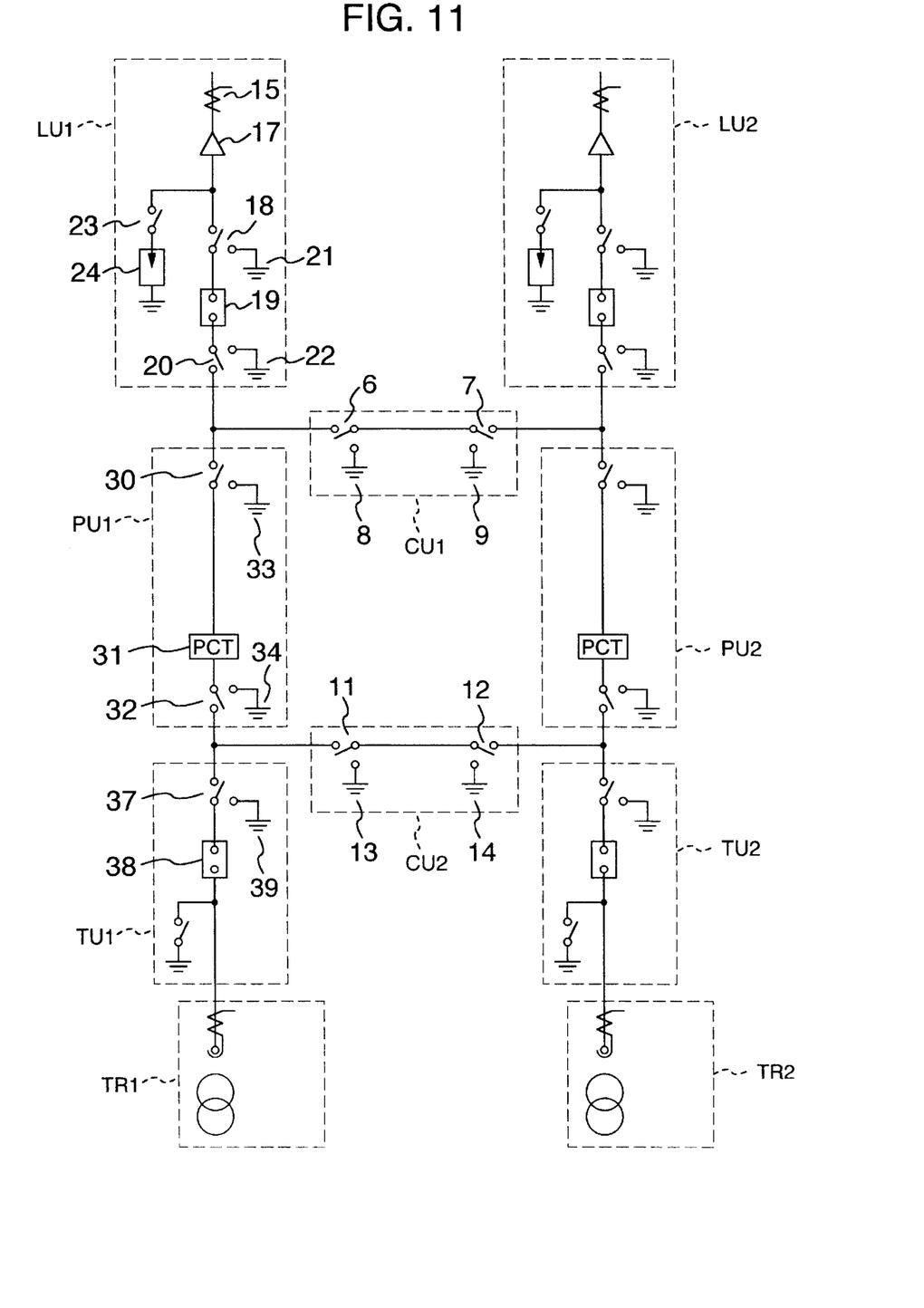
FIG. 11 is a single connection diagram showing a circuit configuration of the gas insulated switchgear in accordance with the first embodiment of the present invention.

FIG. 11 shows a circuit configuration of a gas insulated switchgear in accordance with a first embodiment of the present invention. The circuit configuration of the present embodiment, which can be applied to such a gas insulated switchgear as installed, e.g., in a demander (factory or the like) having an extra-high voltage receiving/transforming facility, is made up of two line power receivers, two metering systems and two banks. More specifically the apparatus includes a first line having a power receiving unit LU1, a potential current transformer unit PU1 and a transformer connecting unit TU1, connected therein; a second line having a power receiving unit LU2, a potential current transformer unit PU2 and a transformer connecting unit TU2, connected therein; a first connection line wired between the first and second lines and having a connecting unit CU1 connected therein; and a second connection line wired between the first and second lines and having a connecting unit CU2 connected therein.

Figure 1:
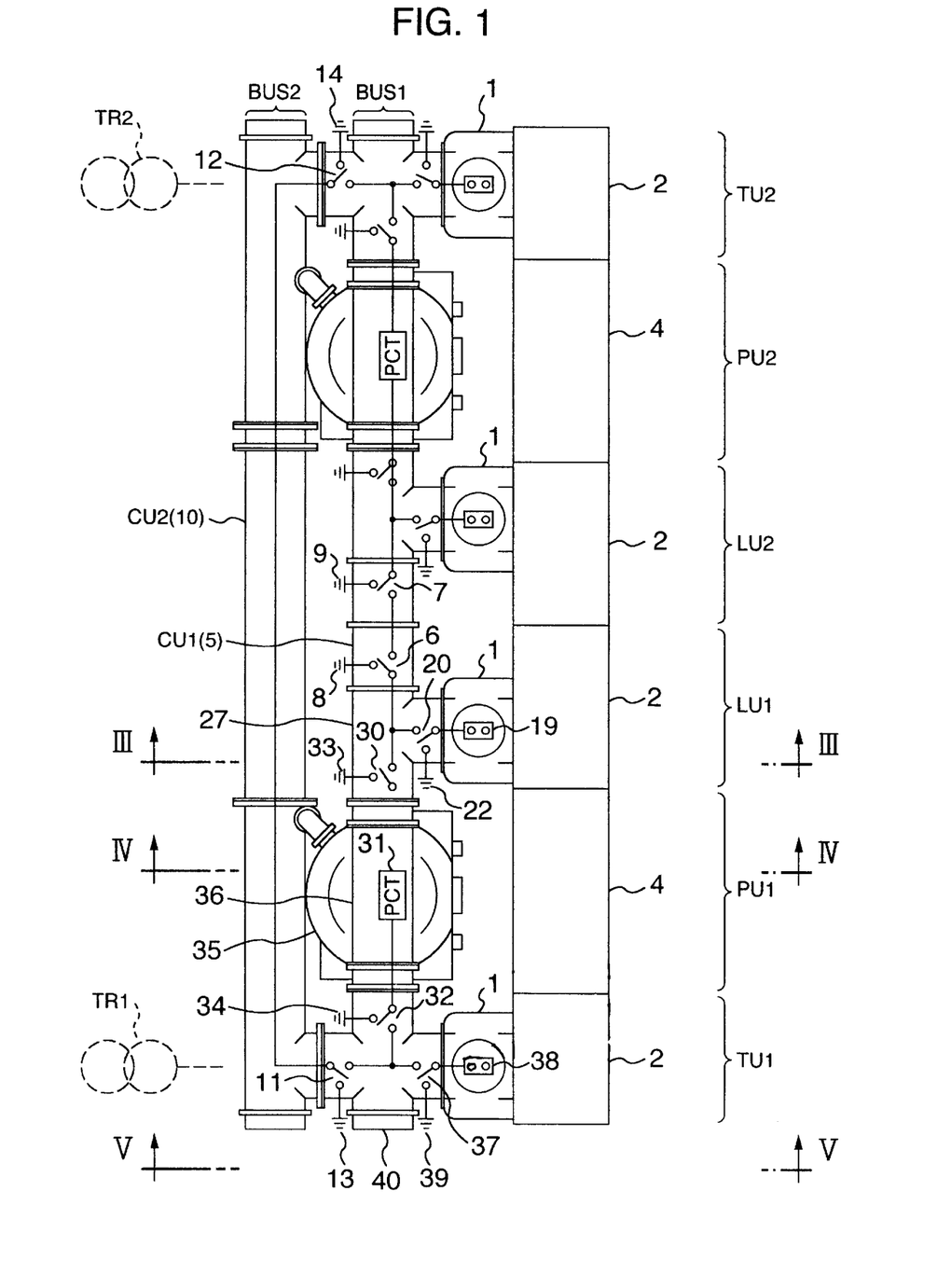
FIG. 1 is a plan view of an array configuration of a gas insulated switchgear in accordance with a first embodiment of the present invention.
Figure 2:
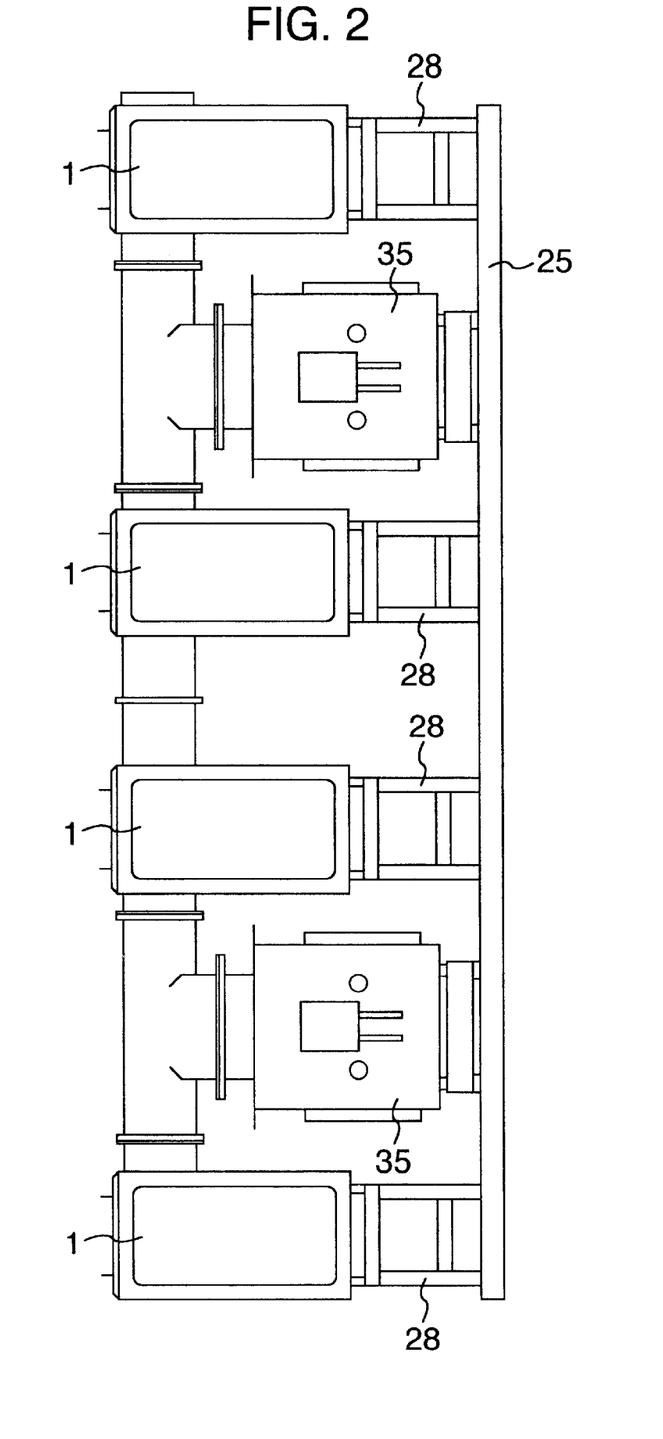
FIG. 2 is a front view of FIG. 1 with a control box being omitted.

FIGS. 1 and 2 show array configurations of an actual gas insulated switchgear to which the circuit configuration of FIG. 11 is applied. In the present embodiment, the power receiving units LU1 and LU2 are provided at both sides of the connecting unit CU1. The potential current transformer unit PU1 is wired as located on a side of the power receiving unit LU1 opposed to the connecting unit CU1, while the potential current transformer unit PU2 is wired as located on a side of the power receiving unit LU2 opposed to the connecting unit CU1. The transformer connecting unit TU1 is wired as located on a side of the potential current transformer unit PU1 opposed to the power receiving unit LU1, whereas the transformer connecting unit TU2 is wired as located on a side of the potential current transformer unit PU2 opposed to the power receiving unit LU2. Wired between the transformer connecting units TU1 and TU2 is the connecting unit CU2 arranged in parallel with the connecting unit CU1 and horizontally thereto.

Each of the transformer connecting units TU1 and TU2 and power receiving units LU1 and LU2 has a container 1 for accommodating a circuit breaker therein, a control box 2 for accommodating an operating mechanism of the breaker therein, and a control box 3 for accommodating an operating mechanism of a disconnecting switch therein. The breaker containers 1 of the units are located on respective sides of the units opposed to the connecting unit CU2 so as to be arranged in a row on an identical straight line parallel to the connecting unit CU2. The control boxes 2 and 3 of each unit is positioned as laminated on a side of the breaker container 1 opposed to the connecting unit CU2 so that the control box 2 is located in an upper stage while the control box 3 is located in a lower stage. The control boxes 2 and 3 in the form of a laminated panel are arranged in a row on the same straight line as the connecting unit CU2 and parallel thereto. The potential current transformer units PU1 and PU2 are provided with a control box 4. The control boxes 4 of the units are arranged in a row including box laminates of the control boxes 2 and 3.

The connecting unit CU1 forms a first connection line which connects together a primary side of a potential current transformer of the potential current transformer unit PU1 and a primary side of a potential current transformer of the potential current transformer unit PU2, and a cylindrical accommodation container 5 collectively contains three phase conductors extended in a central axis direction of the container as arranged vertically linearly with respect to the ground. Connected in each of the three phase conductors are circuit breakers 6 and 7.

The circuit breakers 6 and 7 are provided with earthing switches 8 and 9 respectively which can each take three positions of open, closed and grounded. When such circuit breakers are employed, it eliminates the need for independent installation of the earthing switch, which results in that the number of component devices in one unit can be reduced and thus the size of the accommodation container of the operating device can be decreased. Further, the number of operating devices can be reduced to realize efficient maintenance.

The connecting unit CU2 forms a second connection line which connects together a secondary side of a potential current transformer of the potential current transformer unit PU1 and a secondary side of a potential current transformer of the potential current transformer unit PU2, and a cylindrical accommodation container 10 collectively contains three phase conductors extended in a central axis direction of the container as arranged vertically linearly with respect to the ground. Connected in each of the three phase conductors are circuit breakers 11 and 12. The circuit breakers 11 and 12 are provided with earthing switches 13 and 14 respectively which can take three positions, as in the aforementioned circuit breakers. The accommodation container 10 is branched in the form of a letter 'T' to get ready for future additional provision of a transformer connecting unit.

Figure 3:
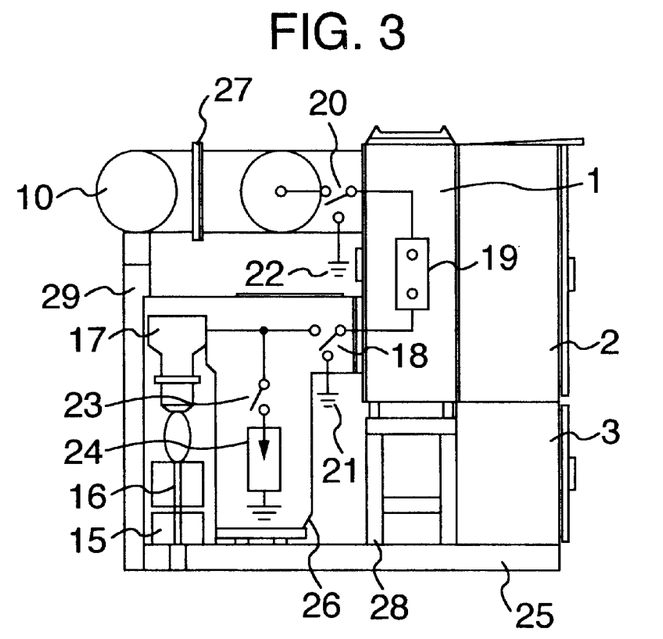
FIG. 3 is a cross sectional view taken along an arrowed line III—III in FIG. 1.

FIG. 3 is a cross sectional view taken along an arrowed line III—III in FIG. 1, showing a structure of the power receiving unit LU1. Although only the structure of the power receiving unit LU1 will be explained in the following, the power receiving unit LU2 also has the same structure as the unit LU1. The power receiving unit LU1, which acts to receive a power supplied from a power supply system (not shown), includes a conductor line extended from a cable head 17 to the adjacent potential current transformer unit PU1. Installed in the conductor line are a disconnecting switch 18, a circuit breaker 19 and a disconnecting switch 20. The disconnecting switches 18 and 20 have earthing switches 21 and 22 can take three positions respectively, as in the case of the aforementioned circuit breakers. Further, for the purpose of protecting the transformers from thunder surge invaded from the power supply system when a ground-fault accident took place due to the falling of a thunderbolt, a lightning arrester 24 is provided in the power receiving unit LU1 between a conductor connecting the cable head 17 and disconnecting switch 18 together and the ground via a separator 23.

In this embodiment, the cable head 17 is used to provide T-shaped branches, to one of which a conductor line extended to the potential current transformer unit PU1 is connected, and to the other of which a connection terminal is provided for connection of various types of voltage withstanding test instruments and bypass circuits. Since such a T-shape branched cable head is used, various types of voltage withstanding tests can be carried out without conducting works of supplying or discharging the isolating gas or works of disassembling the units. Further in case of emergency, the bypass circuit can be connected to interchangeably supply power to another load or the like.

A cylindrical accommodation container 26 having an elbow-shaped section is installed on one side of a base 25. Collectively installed in the accommodation container 26 are the disconnecting switches 18, separators 23 and lightning arresters 24 corresponding to three phases. Disposed above the accommodation container 26 is a T-branched cylindrical accommodation container 27. Collectively housed in the accommodation container 27 are the disconnecting switches 20 corresponding to three phases. Installed on the other side of the base 25 is the square breaker container 1 via a carrier base 28. The accommodation container 26 is joined in a lower side of the breaker accommodation container 1 and opposite side of square control boxes 2, 3 through an insulating spacer, and in an upper side of which the accommodation container 27 is coupled via an insulating spacer so as not to exceed the breaker accommodation container 1 in height. The circuit breakers 19 corresponding to three phases are collectively housed in the breaker accommodation container 1. The cable heads 17 corresponding to three phases are mounted on a side of the accommodation container 26 opposed to the breaker accommodation container 1.

Coupled to one (opposed to the potential current transformer unit PU1) of the T-shaped branches of the accommodation container 27 is the accommodation container 5 of the connecting unit CU1 via an insulating spacer. Coupled to the other of the accommodation container 27 opposed to the breaker accommodation container 1 is the accommodation container 10 of the connecting unit CU2 as arranged in parallel with the accommodation container 27 and parallelly therewith. The accommodation container 10 is supported by supporting rods 29. Provided on a side of the breaker accommodation container 1 opposed to the accommodation container 26 is a stack box corresponding to a laminate of the square control box 2 containing a breaker operating mechanism and the square control box 3 containing a disconnecting switch operating mechanism. The control box 2 has substantially the same height dimension as the breaker accommodation container 1, while the control box 3 has substantially the same height dimension as the carrier base 28.

Figure 4:
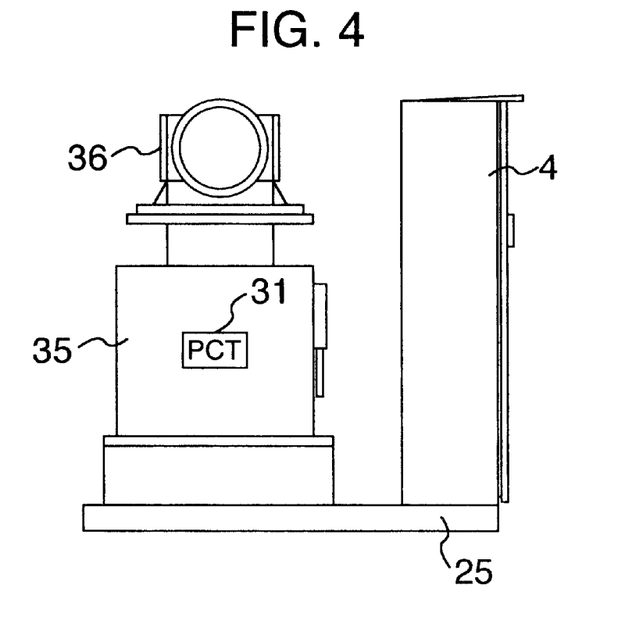
FIG. 4 is a cross sectional view of an arrowed line IV—IV in FIG. 1, showing a structure of a potential current transformer unit.

FIG. 4 is a cross sectional view taken along an arrowed line IV—IV in FIG. 1 , showing a structure of the potential current transformer unit PU1. Although only the structure of the potential current transformer unit PU1 will be explained in the following, the potential current transformer unit PU2 also has the same arrangement as the unit PU1. The potential current transformer unit PU1 functions to measure a received power. Provided in a conductor line extended from the power receiving unit LU1 to the transformer connecting unit TU1 are a disconnecting switch 30, a potential current transformer 31 and a disconnecting switch 32. As in the aforementioned disconnecting switches, the disconnecting switches 30 and 32 are provided with earthing switches 33 and 34 which can take three positions respectively.

Installed on one side of the base 25 is an accommodation container 35 which accommodates the potential current transformer 31 in such a manner as to form a row arrangement with the aforementioned accommodation container 26 of the power receiving unit LU1. A cylindrical accommodation container 36 is disposed right above the accommodation container 35. The accommodation container 36 is located at the same position as the accommodation container 27 to be coupled with the aforementioned accommodation container 27 of the power receiving unit LU1 via an insulating spacer. The disconnecting switches 30 corresponding to three phases are collectively housed in the aforementioned accommodation container 27 of the power receiving unit LU1. The control box 4 is installed on the other side of the base 25. The control box 4 is arranged to form a row as a stack of the control box 2 of the power receiving unit LU1 and the control box 3. Provided on a side of the accommodation container 36 provided with the control box 4 is the accommodation container 10 of the connecting unit CU2 to be arranged in parallel with the accommodation container 36 and horizontally thereto.

Figure 5:
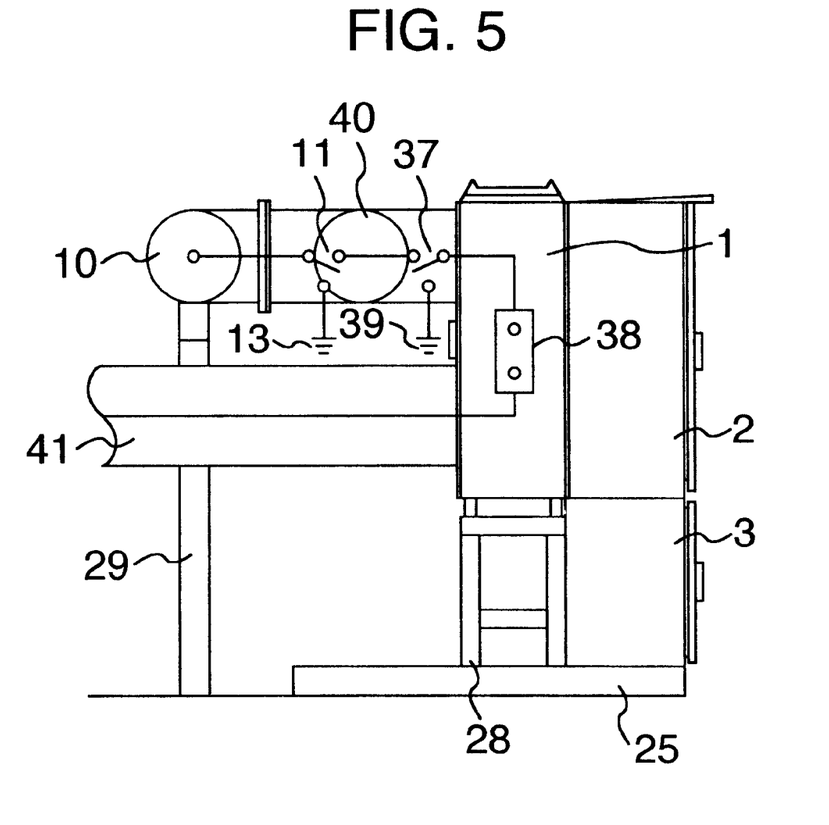
FIG. 5 is a left side view of FIG. 1, showing a structure of a transformer connecting unit.

FIG. 5 is a left-side view of FIG. 1, showing an arrangement of the transformer connecting unit TU1. Although only the arrangement of the transformer connecting unit TU1 will be explained in the following, the transformer connecting unit TU2 also has the same arrangement as the unit TU1. The transformer connecting unit TU1 is used to supply the received power to a transformer TR1 electrically connected thereto, and includes a line conductor extended from the potential current transformer unit PU1 to the transformer TR1. Connected in the line conductor are a disconnecting switch 37 and a circuit breaker 38. As in the foregoing circuit breaker, the disconnecting switch 37 is provided with a earthing switch 39 which can take three positions.

Installed on one side of the base 25 are the square breaker accommodation containers 1 through the associated carrier bases 28 forming rows with the breaker accommodation containers 1 of the power receiving units LU1. Installed on one side of the breaker accommodation container 1 is a stack of the control boxes 2 and 3 so as to form a row with the aforementioned stack of the control boxes 2 and 3 of the power receiving unit LU1. The control box 2 has substantially the same height dimension as the breaker accommodation container 1, while the control box 3 has substantially the same height as the carrier base 28.

Coupled to the breaker accommodation container 1 on the other side in its upper part is a T-shape branched cylindrical accommodation container 40 through an insulating spacer. The accommodation container 40 is located at the same position as the accommodation container 36 so as to be able to be coupled with the accommodation container 36 of the potential current transformer unit PU1 through an insulating spacer. Collectively housed in the accommodation container 40 are the disconnecting switches 37, disconnecting switches 32 of the potential current transformer units PU1 and the disconnecting switches 11 corresponding to three phases. Coupled to the breaker accommodation container 1 on the other side in its lower part through an insulating spacer is a cylindrical accommodation container 41 extended to the transformer TR1. Provided on a side of the accommodation container 40 opposed to the breaker accommodation container 1 via an insulating spacer is the accommodation container 10 of the connecting unit CU2 as arranged in parallel to the accommodation container 40 and horizontally thereto. The accommodation container 10 is carried by the supporting rod 29.

Although explanation has been made in connection with the example wherein the transformer connecting unit TU1 and transformer TR1 are interconnected by means of the accommodation container 41 in the present embodiment, the interconnection between the unit TU1 and transformer TR1 may also be realized by mounting a cable head to each of the unit TU1 and transformer TR1 and by connecting them by means of a power cable. When such an interconnection system based on the cable heads is employed, the system arrangement and facility layout can be improved in flexibility to a large extent, which results in that the system can flexibly cope with even restriction conditions of outdoors lands, indoors installation areas and buildings.

Figure 6:
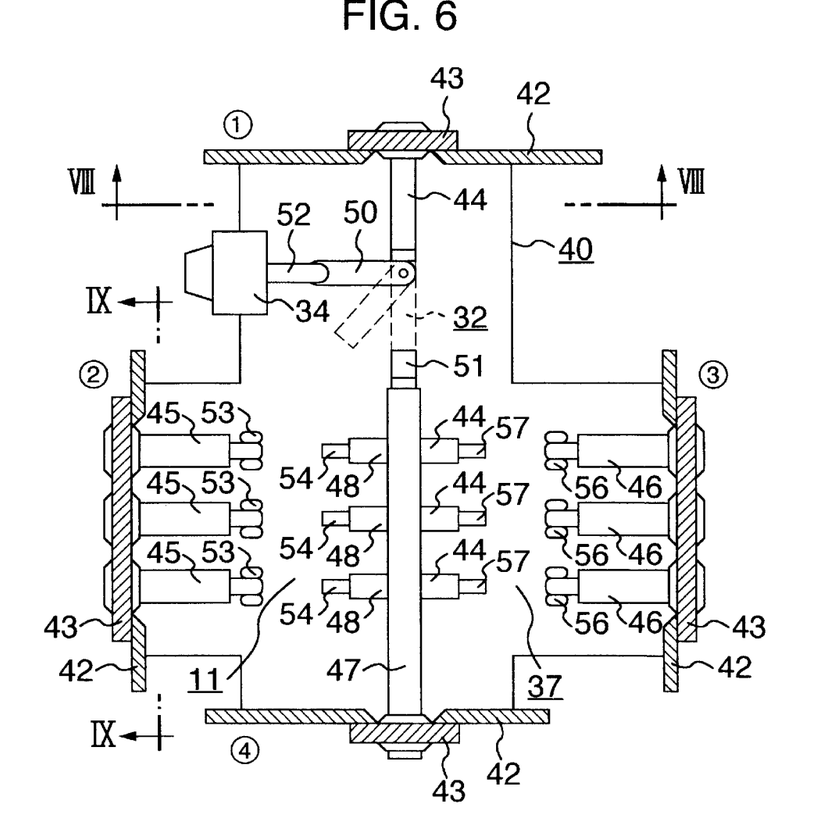
FIG. 6 is a cross sectional view showing a structure of a cross branched container.
Figure 7:
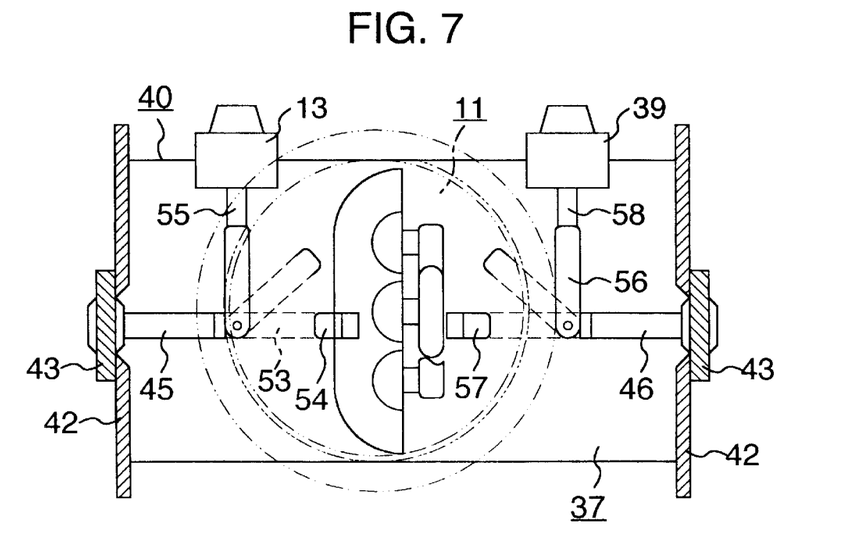
FIG. 7 is a cross sectional view taken along an arrowed line VII—VII in FIG. 6.
Figure 8:
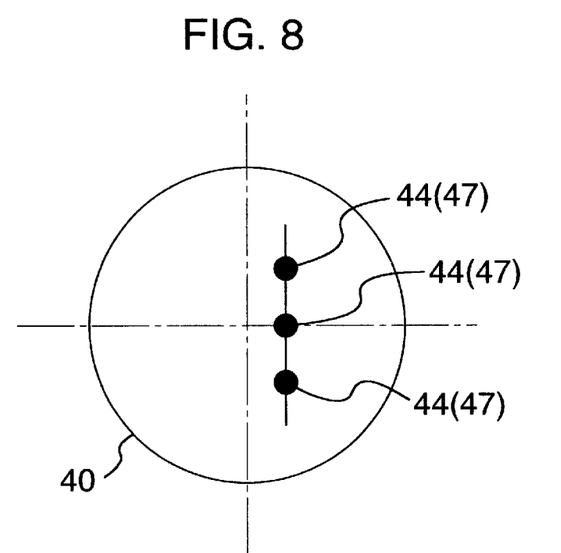
FIGS. 8 to 10 are cross sectional views showing array configurations of three-phase conductors.

FIG. 6 is a cross sectional view of a structure of the cross branched accommodation container 40, FIG. 7 is a cross sectional view taken along an arrowed line VII—VII in FIG. 6, and FIGS. 8 to 10 are cross sectional views of an array configuration of three phase conductors. In FIG. 6, symbol ① denotes a connection part of the accommodation container 40 on the side of potential current transformer unit PU1, in which an oblong insulating spacer 43 is fixedly provided nearly in the center of a flange 42 to support conductors 44 corresponding to three phases. FIG. 8 shows a positional relationship of the conductors 44 with respect to the accommodation container 40, in which the conductors 44 corresponding to three phases are linearly arranged vertically to the ground and as biased from the center of the accommodation container 40 toward a side thereof opposite to a earthing switch 34. With such an array, since dimensions between movable conductor and stationary conductor of disconnecting switch and between movable conductor of the disconnecting switch and conductor of the earthing switch can be adjusted as constant, therefore, three-states such as, opened, closed and grounded can be taken without changing dimensions of the container.

Figure 9:
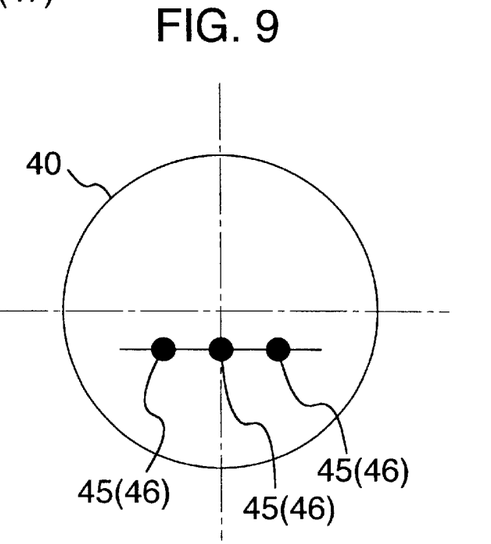

Symbol ② denotes a connection part of the accommodation container 40 on the side of the connecting unit CU2, in which the oblong insulating spacer 43 is fixedly mounted nearly in the center of the flange 42 to support 10 conductors 45 corresponding to three phases. FIG. 9 shows a positional relationship of the conductors 45 with respect to the accommodation container 40, in which the conductors 45 corresponding to three phases are linearly arranged parallelly to the ground as biased from the center of the accommodation container 40 toward a side thereof opposite to a earthing switch 13. Symbol ③ denotes a connection part of the accommodation container 40 on the side of the breaker accommodation container 1 of the transformer connecting unit TU1, in which the oblong insulating spacer 43 is fixedly mounted nearly in the center of the flange 42 to support conductors 46 corresponding to three phases. As in the conductors 45, the conductors 46 corresponding to three phases are also linearly arranged parallelly to the ground as biased from the center of the accommodation container 40 toward a side thereof opposite side with the earthing switch 39.

Figure 10:
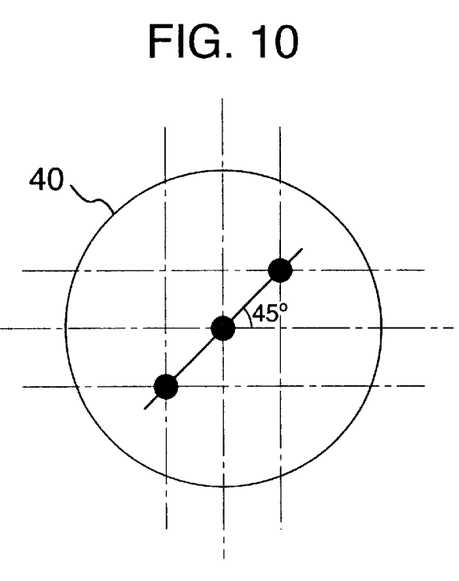

Explanation has been made in connection with the case where the conductors corresponding to three phases are linearly arranged parallelly and vertically to the ground as biased from the center of the accommodation container in the present invention. In this case, however, the conductors can be led out in four directions. When the conductors corresponding to three phases are linearly arranged as tiled at 45 degrees to the ground as positioned in the center of the accommodation container as shown in FIG. 10, the conductors can be led out in six directions.

Symbol ④ denotes a connection part of the accommodation container 40 on the side of the extension unit, in which the oblong insulating spacer 43 is fixedly mounted nearly in the center of the flange 42 to support conductors 47 corresponding to three phases. As in the conductors 44, the conductors 47 corresponding to three phases are also linearly arranged vertically to the ground as biased from the center of the accommodation container 40 toward the side of the conductors 46. The conductors 47 are arranged as oppose to the conductors 44 on an identical plane to the conductors 44. Conductors 48 and 49 each corresponding to three phases are linearly branched from the conductors 47 parallelly to the ground. The conductors 48 are opposed to the conductors 45 on an identical plane to the conductors 45. The conductors 49 are opposed to the conductors 46 on an identical plane to the conductors 46. The plane of the conductors 48 and 45 is the same as that of the conductors 49 and 46. A plane of the conductors 44 and 47 and a plane of the conductors 45, 46, 48 and 49 are vertically crossed so that straight lines parallel to the respective planes become parallel to the opposing planes.

A movable conductor 50 of the disconnecting switch 32 is provided at the tip end of each of the conductors 44. A stationary conductor 51 of the disconnecting switch 32 connected to the movable conductor 50 separatably therefrom is provided at the tip end of each of the conductors 47. The movable conductor 50 is arranged to be rotated by 90 degrees around the conductor 44 as a rotary axis, and a stationary conductor 52 of the earthing switch 34 attached to the disconnecting switch 32 is provided at a 90-degree rotated part of the movable conductor 50.

A movable conductor 53 of the disconnecting switches 11 is provided at a tip end of each of the conductors 45. A stationary conductor 54 of the disconnecting switches 11 connected to a movable conductor 53 separatably therefrom is provided at a tip end of each of the conductors 48. The movable conductor 53 is arranged to be rotated by 90 degrees around the conductor 45 as a rotary axis, and a stationary conductor 55 of the earthing switch 13 attached to the disconnecting switches 11 is provided at a 90-degree rotated part of the movable conductor 53.

A movable conductor 56 of the disconnecting switch 37 is provided at a tip end of each of the conductors 46. A stationary conductor 57 of the disconnecting switch 37 connected to a movable conductor 56 separatably therefrom is provided at a tip end of each of the conductors 49. The movable conductor 56 is arranged to be rotated by 90 degrees around the conductor 46 as a rotary axis, and the stationary conductor 58 of the earthing switch 39 attached to the disconnecting switch 37 is provided at a 90-degree rotated part of the movable conductor 56.

In the present embodiment, a connection bus BUS1 is made up of line conductors extended from the transformer connecting unit TU1 through the potential current transformer unit PU1, power receiving unit LU1, connecting unit CU1, power receiving unit LU2 and potential current transformer unit PU2 to the transformer connecting unit TU2; while a connection bus BUS2 is made up of line conductors extended from the transformer connecting unit TU1 through the connecting unit CU2 to the transformer connecting unit TU2.

In the present embodiment, since a connection mechanism called a tulip contact is used to connect, therefore, by connecting adjacent two accommodation containers, that is, to realize automatic connection of the conductors simultaneously with the connection of the accommodation containers. Use of such a connection mechanism enables efficient unit assembly and disassembly.

In accordance with the present invention, since the connecting units CU2 are arranged in parallel horizontally to the connecting units CU1, the height dimensions of the power receiving units LU1 and LU2, potential current transformer units PU1 and PU2 and transformer connecting units TU1 and TU2 can be made small and thus the overall height dimension of the entire apparatus can be made small. Accordingly, when it is desired to disassemble and transport the apparatus, the apparatus can be transported with use of an ordinary truck. Further, since the entire apparatus height can be made low, the gravity center of the entire apparatus can be made low, thus improving the vibrational resistance of the apparatus.

The connecting unit CU2 is disposed on one side of the connecting unit CU1 and the breaker accommodation container 1 and control boxes 2, 3 and 4 are disposed on the other side of the connecting unit CU1, so that the entire apparatus can be reduced in size and installation area while eliminating any wasteful spaces between the accommodation containers of the units. The residual accommodation containers of the units may be installed in a space defined between the first bus and base 25.

Since the potential current transformers 31 of the potential current transformer units PU1 and PU2 are disposed right under the respective accommodation containers 36, the potential current transformer units PU1 and PU2 can be reduced in size and thus the entire apparatus can be made small in size.

Further, the power receiving units LU1 and LU2 are disposed in the center of the apparatus, the potential current transformer units PU1 and PU2 are disposed outside thereof, and the transformer connecting units TU1 and TU2 are disposed further outside thereof. Therefore when it is desired in future to additionally provide transformers due to increased loads, a transformer connecting unit to be added may be provided outside of the existing transformer connecting unit, enabling easy addition of the unit while eliminating the need for disassembly and transportation of the existing unit.

Further, when the units are arranged in such rows as mentioned above, the lines extended from the power receiving units LU1 and LU2 to the transformer connecting units TU1 and TU2 can be directed in one direction. In other words, when the transformer connecting units TU1 and TU2 are exchanged in array for the potential current transformer units PU1 and PU2 or when the power receiving units LU1 and LU2 are exchanged in array for the potential current transformer units PU1 and PU2; it is required to direct the lines extended from the power receiving units LU1 and LU2 to the transformer connecting units TU1 and TU2 once in a reverse direction. However, when the units are arranged in such rows as mentioned above, the lines extended from the power receiving units LU1 and LU2 to the transformer connecting units TU1 and TU2 can be directed in one direction. Accordingly since the apparatus configuration can be made simple, the entire apparatus can be reduced in size.

In addition, the operating mechanisms of the circuit breakers and disconnecting switches are housed in the control boxes 2 and 3 stacked on the sides of the breaker accommodation containers 1 opposed to the connecting units (on the front side of the apparatus as viewed from the entire apparatus), the operability and maintenance of the apparatus can be improved over those when the operating mechanisms are disposed independently. Further, since the height dimensions of the units are reduced and the control boxes 2 and 3 are formed according to the heights as mentioned above, the need for an inspection base which has been so far required for inspection in the prior art can be eliminated and the inspection can be easily carried out.

Since the disconnecting switches on the secondary sides of the potential current transformer units PU1 and PU2, the disconnecting switch of the connecting unit CU2 and the disconnecting switches of the transformer connecting units TU1 and TU2 are located within the accommodation container 40, the entire size of the apparatus can be made small.

Figure 14:
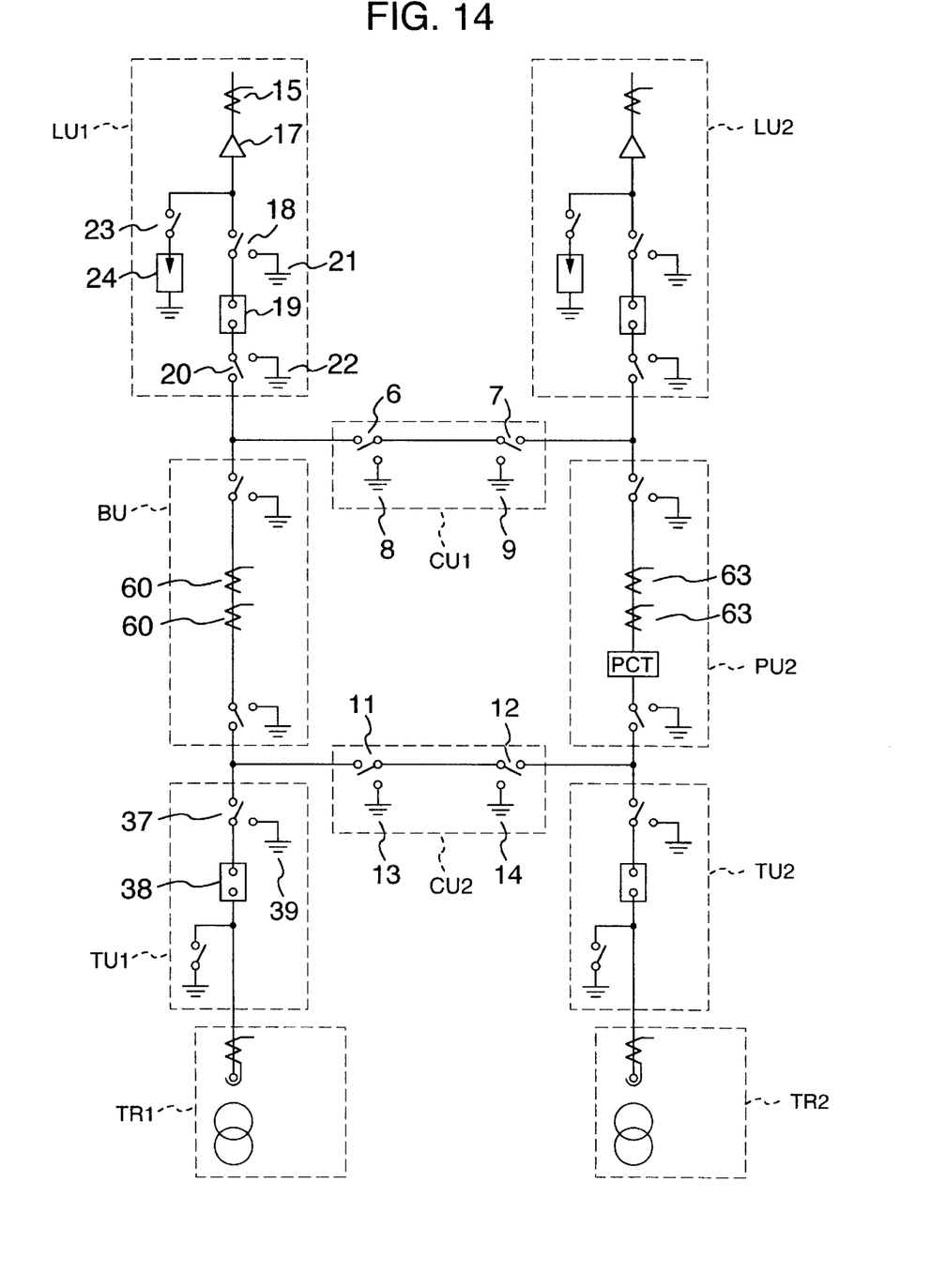
FIG. 14 is a single connection diagram of a circuit configuration of the gas insulated switchgear in accordance with the second embodiment of the present invention.

FIG. 14 is a single connection diagram of a circuit configuration of a gas insulated switchgear in accordance with a second embodiment of the present invention. The present embodiment is arranged to include two line power reception, double metering, two-bank systems. For this reason, in the second embodiment unlike the first embodiment, the potential current transformer of the first line is omitted to install a potential voltage transformer instead, and a potential voltage transformer is provided in the primary side of the potential current transformer of the second line. Other parts of the second embodiment are substantially the same as the first embodiment.

Figure 12:
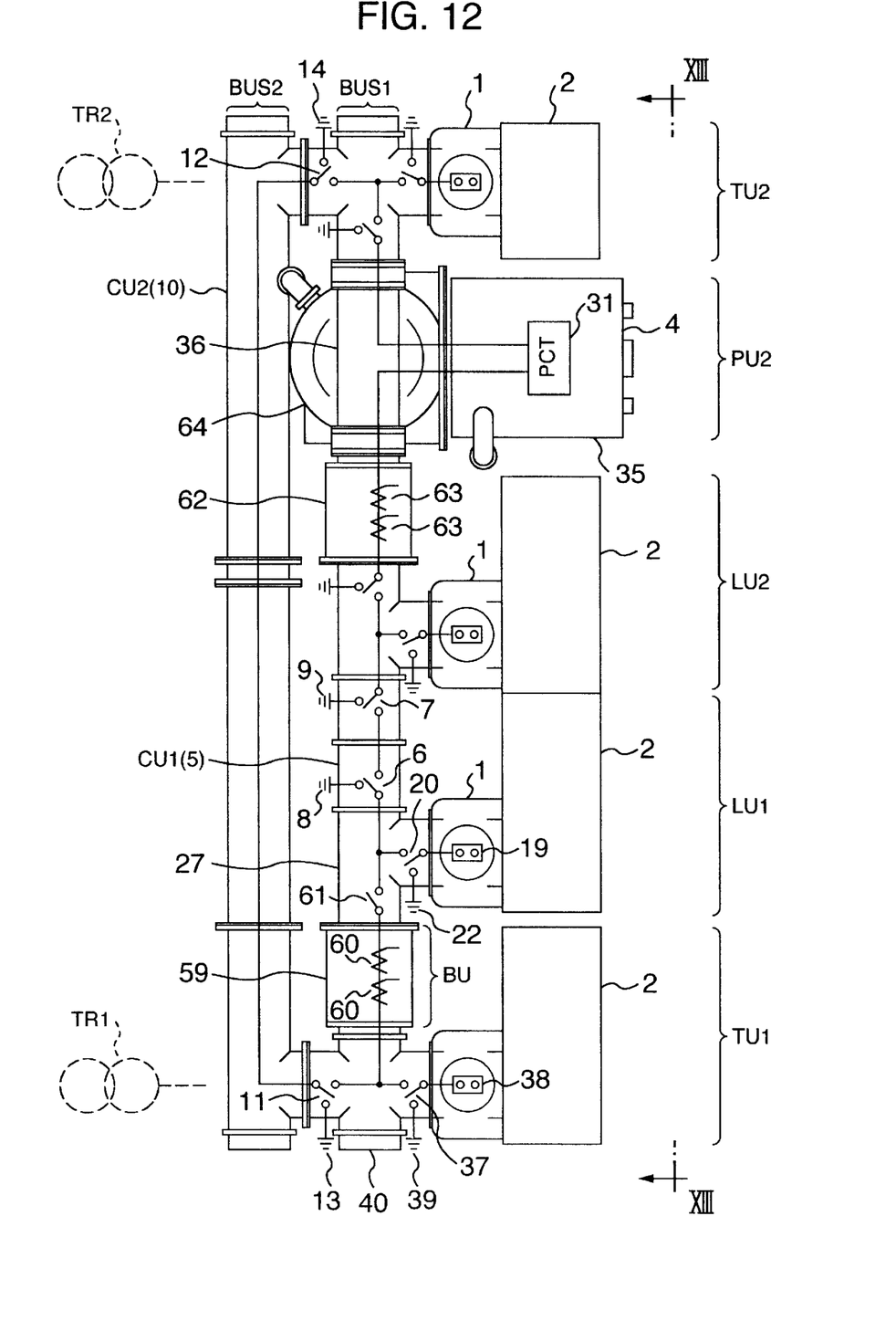
FIG. 12 is a plan view of an arrangement of a gas insulated switchgear in accordance with a second embodiment of the present invention.
Figure 13:
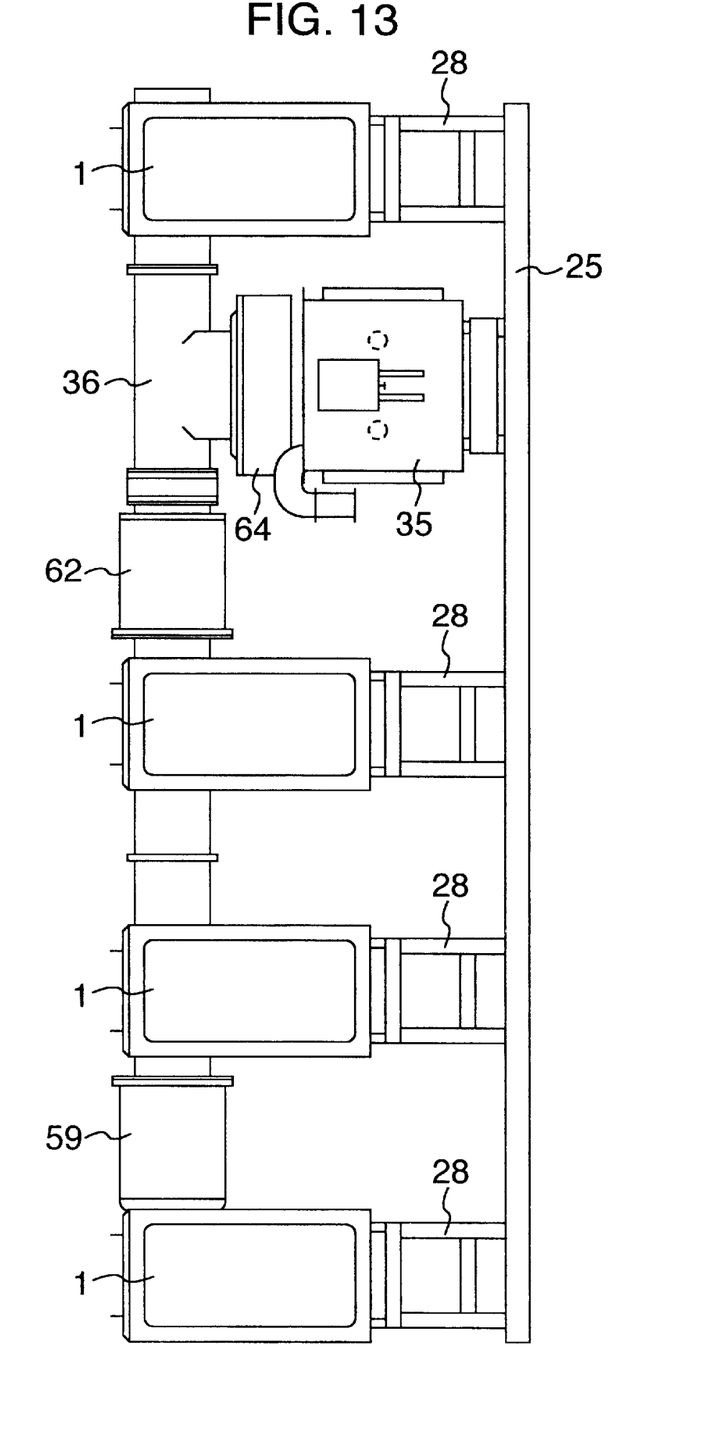
FIG. 13 is a front view of FIG. 12 with a control box being omitted.

FIG. 12 is a plan view of an arrangement of an actual gas insulated switchgear to which the circuit configuration of FIG. 14 is applied. FIG. 13 is a front view of FIG. 12 with the control boxes omitted. In the present embodiment, a bypass unit BU (corresponding to the potential current transformer unit PU1 of the first embodiment but the potential current transformer 31 omitted) is coupled to a side of the power receiving unit LU1 opposed to the connecting unit CU1. The potential current transformer unit PU2 is coupled to a side of the power receiving unit LU2 opposed to the connecting unit CU1.

The bypass unit BU includes a cylindrical accommodation container 59 which has a diameter larger than that of the accommodation container 27 of the power receiving unit LU1 and which accommodates a potential voltage transformer provided to a line conductor 60 extended from the power receiving unit LU1 to the transformer connecting unit TU1. Provided to the line conductor extended from the power receiving unit LU1 to the transformer connecting unit TU1 is a disconnecting switch 61. The disconnecting switches 61 corresponding to three phases are collectively accommodated within the accommodation container 27 of the power receiving unit LU1. The accommodation container 27 of the power receiving unit LU1 is coupled to one side of an accommodation container 62 via an insulating spacer, while the accommodation container 40 of the transformer connecting unit TU1 is coupled to the other side of the accommodation container 62 via an insulating spacer.

The cylindrical accommodation container 62 having a diameter larger than those of the accommodation containers 5 and 27 of the connecting unit CU1 and power receiving unit LU2 is coupled between the accommodation containers 5 and 27 via an insulating spacer, and a potential voltage transformer 63 is accommodated within the accommodation container 62. An elbow-shaped accommodation container 64 is provided under the accommodation container 36, and the accommodation container 35 containing the potential current transformer 31 is coupled with the accommodation container 64. Other parts of the present embodiment are substantially the same as the first embodiment and thus explanation thereof is omitted.

As in the first embodiment, the connecting unit CU2 is arranged horizontally to the connecting unit CU1 horizontally thereto even in the present embodiment, the height dimension of the entire apparatus can be made small in size. Accordingly when it is desired to disassemble and transport the apparatus, ordinary truck transportation can be employed. Further, since the height dimension of the entire apparatus is made low, the gravity center of the entire apparatus can be made low and thus the vibrational resistance of the apparatus can be improved. In parts of the second embodiment similar to those of the first embodiment, effects similar to those in the first embodiment can be attained.

What is claimed is:

1. A gas insulated switchgear comprising:
   two potential current transformer units each having a potential current transformer and a primary side and a secondary side;
   first and second connecting units for connecting primary sides and secondary sides of said two potential current transformer units;
   two power receiving units for receiving power supplied from a power supply system; and
   two transformer connecting units electrically connected to said two potential current transformer units,
   wherein each of said two potential current transformer units, first and second connecting units, two power receiving units, and two transformer connecting units are electrically connected with each other by means of connection buses, and a connection bus for connecting said potential current transformer units, said first connecting unit, said power receiving units and said transformer connecting units is arranged horizontally to said second connecting unit for connecting said two transformer connecting units disposed at both ends of said connection buses and in parallel thereto.

2. A gas insulated switchgear comprising:
   two potential current transformer units each having a potential current transformer and a primary side and a secondary side;
   first and second connecting units for connecting primary sides and secondary sides of said two potential current transformer units;
   two power receiving units for receiving power supplied from a power supply system; and
   two transformer connecting units electrically connected to said two potential current transformer units,
   wherein each of said two potential current transformer units, first and second connecting units, two power receiving units and two transformer connecting units are electrically connected with each other by means of connection buses, said power receiving units are disposed on both sides of said first connecting unit, said potential current transformer units are disposed on both sides of said first connecting unit, said transformer connecting units are disposed outside of said first connecting unit, and connection buses connecting said potential current transformer units, said first connecting unit, said power receiving units and said transformer connecting units are arranged horizontally to said second connecting unit for connecting said two transformer connecting units and in parallel thereto.

3. A gas insulated switchgear as set forth in claim 1, wherein breaker accommodation containers of said power receiving and transformer connecting units and control boxes of said power receiving units, transformer connecting units and potential current transformers are disposed on one side of said connection bus, and said second connecting unit is disposed on the other side of said connection bus.

4. A gas insulated switchgear as set forth in claim 3, wherein said control box is provided on a side of said breaker accommodation container opposed to said connection bus.

5. A gas insulated switchgear as set forth in claim 1, wherein the potential current transformer of said potential current transformer unit is disposed substantially right below said connection bus.

6. A gas insulated switchgear as set forth in claim 1, wherein said potential current transformer unit, second connecting unit and transformer connecting unit are connected by means of a cross branch container, three phase conductors led out from opposing first and second branch directions are linearly arranged on an identical first plane, three phase conductors led out from opposing third and fourth branch directions are linearly arranged on an identical second plane, and said three phase conductors are connected so that said first and second planes are perpendicular to each other and straight lines parallel to the planes are parallel to the respective planes.

7. A gas insulated switchgear as set forth in claim 1, wherein said potential current transformer unit, second connecting unit and transformer connecting unit are connected by means of a cross branch container, and disconnecting switches of the units are provided within said cross branch container.

8. A gas insulated switchgear comprising:

potential current transformer units each having a potential current transformer;

a bypass circuit unit;

a first connecting unit for connecting a primary side of said potential current transformer unit and one side of said bypass circuit unit;

a second connecting unit for connecting a secondary side of said potential current transformer unit and the other side of said bypass circuit unit;

two power receiving units for receiving power supplied from a power supply system; and two transformer connecting units electrically connected to the transformers, wherein each of said units are electrically connected with each other by means of connection buses, and a connection bus for connecting said potential current transformer units, bypass circuit unit, first connecting unit, power receiving units and transformer connecting units is arranged horizontally to said second connecting unit for connecting said two transformer connecting units disposed at both ends of said connection buses and in parallel thereto.

9. A gas insulated switchgear comprising:

potential current transformer units each having a potential current transformer;

a bypass circuit unit;

a first connecting unit for connecting a primary side of said potential current transformer unit and one side of said bypass circuit unit;

a second connecting unit for connecting a secondary side of said potential current transformer unit and the other side of said bypass circuit unit;

two power receiving units for receiving power supplied from a power supply system; and two transformer connecting units electrically connected to the transformers, wherein each of said potential current transformer units, bypass circuit unit, first and second connecting units, two power receiving units and two transformer connecting units are electrically connected with each other by means of connection buses, said power receiving unit is provided on both sides of said first connecting unit, said potential current transformer unit is provided on one side thereof, said bypass circuit unit is provided on the other side thereof, said transformer connecting unit is provided outside thereof, a connection bus for connecting said potential current transformer unit, bypass circuit unit, first connecting unit, power receiving unit and transformer connecting unit is arranged horizontally to said second connecting unit for connecting said two transformer connecting units and in parallel thereto.

* * * * *